United States Patent [19]

Samuels et al.

[11] Patent Number: 5,132,716
[45] Date of Patent: * Jul. 21, 1992

[54] SYSTEM FOR UPDATING SOFTWARE IN AUTOMATIC FILM PROCESSOR

[75] Inventors: James T. Samuels; Roger D. Ellsworth, both of Rochester, N.Y.

[73] Assignee: Eastman Kodak Company, Rochester, N.Y.

[*] Notice: The portion of the term of this patent subsequent to Oct. 1, 2008 has been disclaimed.

[21] Appl. No.: 616,533

[22] Filed: Nov. 21, 1990

Related U.S. Application Data

[63] Continuation-in-part of Ser. No. 504,742, Apr. 4, 1990, Pat. No. 5,053,797.

[51] Int. Cl.⁵ ............................................ G03D 3/08
[52] U.S. Cl. .................................... 354/322; 354/297
[58] Field of Search ........ 354/297, 298, 299, 319-323, 354/324-327; 355/40, 41, 42; 364/405, 900

[56] References Cited

U.S. PATENT DOCUMENTS

| Re. 30,123 | 10/1979 | Crowell et al. | 137/624.15 |
|---|---|---|---|
| 3,828,172 | 8/1974 | Schickler | 235/151.12 |
| 4,300,828 | 11/1981 | Kaufmann | 354/322 |
| 4,379,335 | 4/1983 | Kirsch et al. | 364/513 |
| 4,419,738 | 12/1983 | Takahashi et al. | 364/900 |
| 4,528,623 | 7/1985 | Tachibana | 364/191 |
| 4,635,183 | 1/1987 | Isobe et al. | 364/141 |
| 4,661,899 | 4/1987 | Usuda | 364/171 |
| 4,703,412 | 10/1987 | Cunningham et al. | 364/140 |
| 4,706,002 | 11/1987 | Fukuyama | 318/568 |
| 4,716,349 | 12/1987 | Kokokawa et al. | 318/562 |

FOREIGN PATENT DOCUMENTS 59-185445 10/1984 Japan .

OTHER PUBLICATIONS

Int. J. Electronics 1979, vol. 46, No. 2, pp. 193-204, "A Minicomputer-Controlled Read-Only-Memory Programmer" by McIntosh et al.

Primary Examiner—L. T. Hix
Assistant Examiner—Howard B. Blankenship
Attorney, Agent, or Firm—G. Herman Childress

[57] ABSTRACT

An automatic film processor having control circuitry including a microprocessor and a plurality of electrically alterable programmable read-only memory (EAPROM) elements for respectively storing main operating program and language codes for control of the processor, has a non-volatile read-only memory (ROM) element containing a bootstrap program including instructions for reprogramming the main program and language ROMs, using addresses and code downloaded from a laptop computer using an RS232 interface. Initialization or reprogramming occurs without the necessity for physically removing or replacing the ROMs, and in response to flags set by software.

19 Claims, 8 Drawing Sheets

SYSTEM FOR UPDATING SOFTWARE IN AUTOMATIC FILM PROCESSOR

This is a continuation-in-part application of copending, commonly-owned U.S. patent application Ser. No. 07/504,742, filed Apr. 4, 1990 now U.S. Pat. No. 5,053,797, entitled "System for Updating Software in Automatic Film Processor."

BACKGROUND OF THE INVENTION

The present invention relates to automatic processors of film and similar photosensitive media, in general; and, in particular, to a system for updating processor control circuitry software by downloading software from an external source by means of reprogramming an on-board programmable read-only memory without removal thereof.

Photosensitive media processors, such as the Kodak X-OMAT processors, are useful in applications such as the automatic processing of radiographic films for medical imaging purposes. The processors automatically transport sheets or webs of photosensitive film, paper or the like (hereafter "film") from a feed end of a film transport path, through a sequence of chemical processing tanks in which the media is developed, fixed, and washed, and then through a dryer to a discharge or receiving end. The processor typically has a fixed film path length, so final image quality depends on factors including transport speed which determines length of time the film strip is in solution, and the temperature and composition of the processing chemicals (the processor "chemistry").

In a typical automatic processor of the type to which the invention relates, film transport speed is set at a constant rate and the chemistry is defined according to a preset recommended temperature, e.g. 93° F., with a specified tolerance range of $+/-X°$ F. A temperature control system is provided in the processor to keep the chemicals within the specified range.

Conventional processors usually include a film width sensor in the form of a reflective infrared sensor array adjacent a feed entrance opening, and may also include a feed detector in the form of a Hall effect switch or the like for detecting separation of entrance rollers due to the passage of film sheets at the front end of the transportation path. The film width sensor not only provides an indication of the width of a sheet entering the processor, but may also provide an indication of the occurrence of the leading edge and trailing edge of each sheet, since the signals from the film width sensor will change significantly as each leading and trailing edge is encountered. Information as to leading and trailing edge occurrences and width of the film, taken with prior knowledge of the constant transport speed, is used to keep track of cumulative total film surface area processed in order to guide chemistry replenishment control. The use of a separate entrance roller detector signals that a sheet of film has actually entered the nip of the first roller pair, and is not just sitting still on the film guide under the width sensor.

Although conventional processors used for radiographic image processing are traditionally configured to operate at a constant film transport speed, modifications may be made through gear changes and the like to vary the process. Moreover, new processors are being introduced which are usable in more than one mode. The mode is often referred to in shorthand fashion by a nominal film transport "drop time", which may be defined as the time from entry of the leading edge of a sheet of film at the feed end until exit of the trailing edge of the same sheet of film at the discharge end. Conventional processors operate in standard (90 second), rapid (45 second), or "Kwik" (30 second) mode, and can be varied to operate in an extended-cycle mode, such as described in L. Taber & A. G. Hans, "Processing of Mammographic Films: Technical and Clinical Consideration," *Radiology, Vol.* 173, No. 1, pages 65–69, October 1989. In the latter mode, processor speed is lowered and chemistry temperature is raised to enhance image contrast for better detection of changes in density of fibrous tissue. The new processors will be settable as to run parameters, including transport speed in order to be able to use the same processor for multiple processing modes.

The operations and functions of such processors are typically handled under control of electronic circuitry including a microcomputer connected to various process sensors and subsidiary controls to receive and dispense electronic signals in accordance with predefined software program instructions. Examples of such control circuitry are shown in U.S. Pat. No. 4,300,828 and in copending, commonly-owned U.S. patent application Ser. No. 07/494,647, entitled "Processor with Temperature Responsive Film Transport Lockout," filed Mar. 16, 1990, the disclosures of which are incorporated herein by reference thereto. The microcomputer may comprise a microprocessor, input/output interface circuitry and one or more memory units, including a read-only memory element (ROM) which contains program instructions and data, such as data in the form of lookup tables. Provision is made in the memory map for a bootstrap memory plane which serves to initiate the system and load the main program at system start-up. Present software updating in processors employing such ROMs is accomplished by physically extracting the memory module from its socket on the control circuit board and inserting a new module including the changed software in its place. Such physical replacement involves equipment downtime and attention by technically trained service personnel. It also entails an unnecessary degree of risk of damage to the memory modules and other processor components due to physical handling.

It is desirable to be able to update product software in the field without having to physically replace components, with less time required by technical service personnel, and with less risk that the modules or processor might be damaged during the updating process. In particular, it is desirable to be able to update processor control circuitry software by downloading software from an external source by means of reprogramming an on-board ROM without removing it from the processor.

Programmable read-only memories (PROMs), such as electrically alterable or erasable PROMs (EA-PROMs or EEPROMs), are known which can be erased and reprogrammed by connecting the same within a programmer after removal of the PROM from its primary operating site. The reprogramming of ultraviolet erasable PROMs by means of a minicomputer-controlled programmer is described in F. McIntosh et al., "A Minicomputer-Controlled Read-Only-Memory Programmer," *Int. J. Electronics* 1979, Vol. 46, No. 2, pp. 193–204. The updating of product software by reprogramming a ROM forming a part of the control circuitry of an automatic film processor without removing the ROM from its normal placement position in the processor is not heretofore known.

SUMMARY OF THE INVENTION

It is an object of the present invention, in connection with apparatus for the automatic processing of film or similar photosensitive media, to provide a system for updating product software by downloading software from an external source by means of reprogramming a programmable read-only memory (PROM) element of a processor control circuitry, without physically removing the PROM itself.

In accordance with the invention, a processor of exposed photosensitive media having means for automatically transporting film along a path through developer, fixer, wash and dryer station under control of a microcomputer including software stored on a programmable read-only memory (PROM) element, further comprises means for executing a sequence of instructions for reprogramming the PROM to change the PROM-located software in accordance with a sequence of address and data input to the processor from an external source.

In one aspect of the invention, a microprocessor is connected for switching between a reprogrammable main ROM element that contains the usual instructions and data normally associated with processor control operations, and an auxiliary ROM element containing a sequence of instructions and data for undertaking the reprogramming of the main ROM in accordance with addresses and data supplied from an external source such as a floppy disk drive, or an RS232 or the like communications link connected to receive information from a modem, laptop computer, or similar external device. In a preferred embodiment, discussed in greater detail below, a control circuit board for a photosensitive media processor includes a main operational program ROM and a plurality of language ROMs. A non-volatile bootstrap program ROM houses the processor resident software, to run entirely independently of the operational program software, for establishing the interface between the board and an external laptop computer for downloading new operational or language software to any of the other ROMs.

BRIEF DESCRIPTION OF THE DRAWINGS

Embodiments of the invention have been chosen for purposes of description and illustration, and are shown in the accompanying drawings, wherein.

Throughout the drawings, like elements are referred to by like numerals.

DETAILED DESCRIPTION OF PREFERRED EMBODIMENTS

Figure 1:
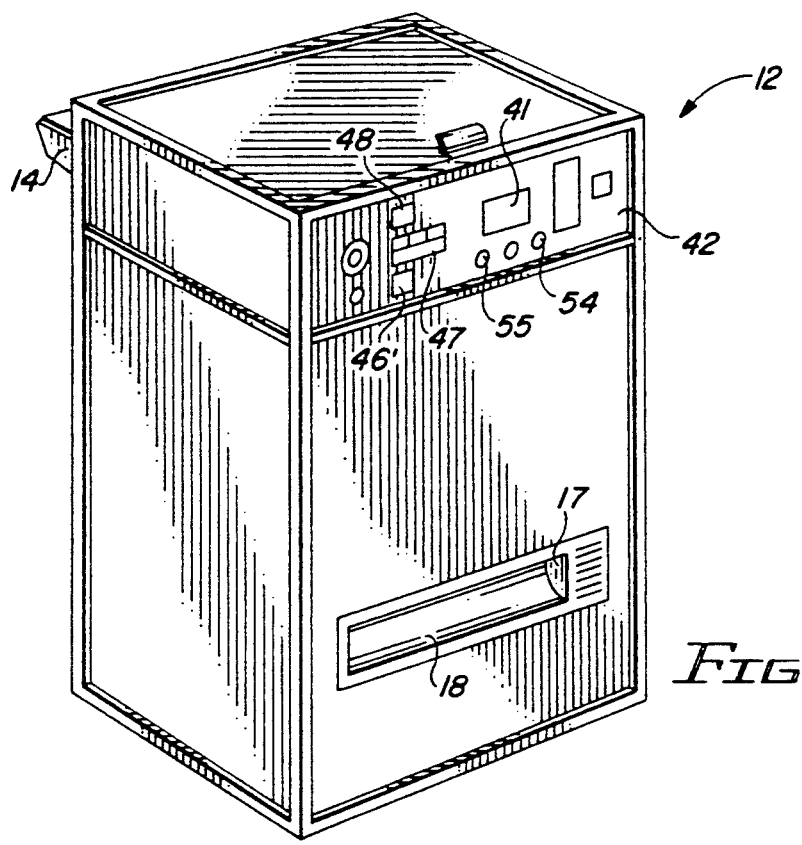
FIG. 1 is a perspective view of a processor in which a software downloading system in accordance with the present invention can be employed.

The principles of the invention are illustrated, by way of example, embodied in the form of a software updating system suitable for use with a processor 12 (FIGS. 1 and 2) for the automatic processing of photosensitive media in the form of sheets of film F (FIG. 2), such as for the development of radiographic images for medical diagnostic purposes.

Figure 2:
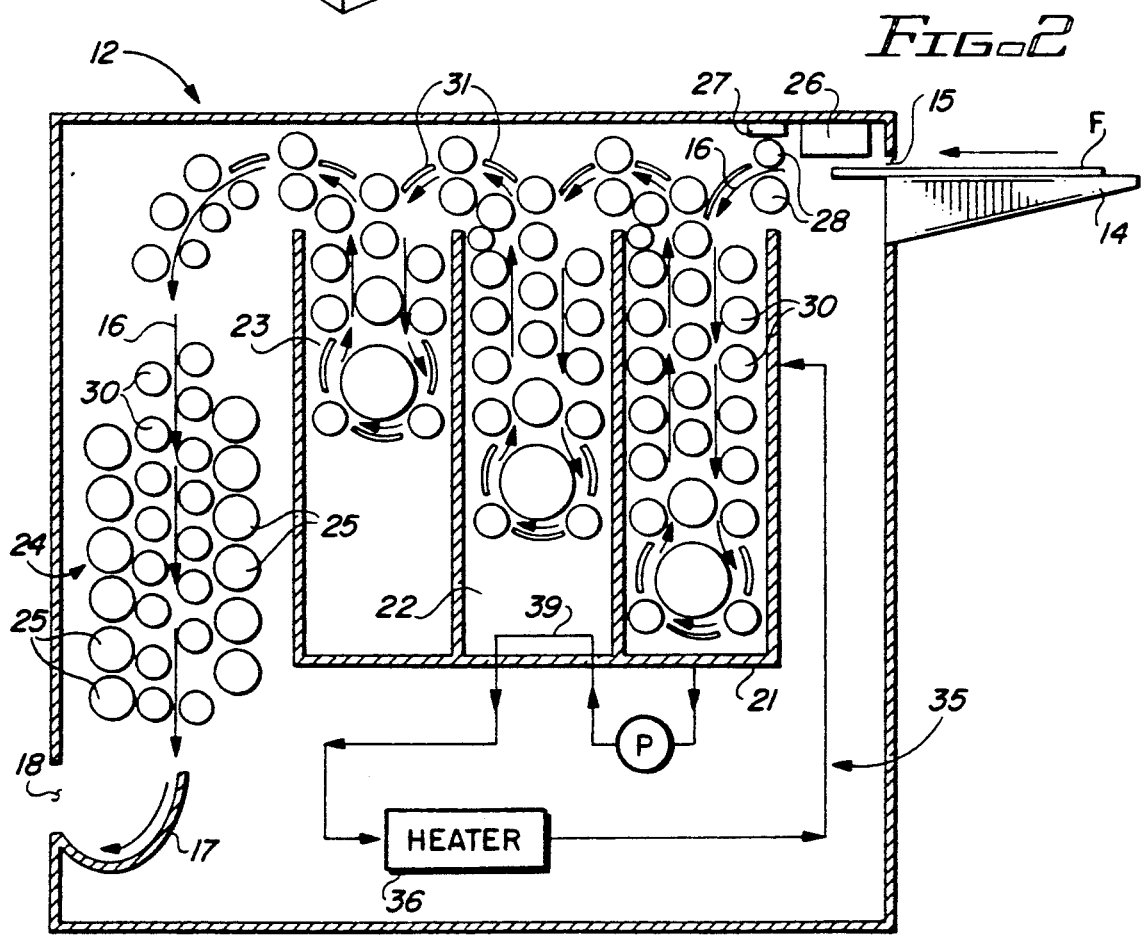
FIG. 2 is a schematic representation of the processor of FIG. 1.

The processor 12 has a feed shelf 14 positioned ahead of an entrance opening 15 (FIG. 2). The front end of the processor 12 including feed shelf 14 and entrance opening 15 is located in a darkroom to avoid unwanted exposure of the sheets F fed into the processor 12. The remaining portion of the processor 12 may be outside the darkroom. Sheets F entered through entrance opening 15 are transported through the processor 12 along a travel path 16 (indicated by arrows), and are eventually driven out of the back end of processor 12 into a catch bin 17 at an exit opening 18.

The processor 12 includes a developing station comprising a tank 21 filled with developer chemical; a fixing station comprising a tank 22 filled with fixer chemical; and a wash station comprising a tank 23 filled with wash water or comprising some other appropriate film washing device. Processor 12 also includes a drying station 24 comprising oppositely-disposed pluralities of air dispensing tubes 25 or some other appropriate film drying mechanism.

Positioned proximate opening 15 is a sensor 26, such as a conventional universal film detector board, reflective infrared sensor array which provides signals indicative of sheet width when a sheet F is presented at the entrance opening 15. The film width sensor 26 also provides an indication of the occurrence of passage of the leading edge and trailing edge of each sheet past point 26 of the processor 12. A second sensor 27 may be provided to detect separation of entrance rollers 28 to signal the beginning of transportation of a sheet of film F along the path 16.

In FIG. 2, the sheet path 16 is shown as defined by a plurality of film transport rollers 30 and a plurality of guide shoes 31 located to direct a sheet of film F sequentially through the tanks 21, 22, 23 and dryer 24. The rollers 30 form the transport system for transporting the sheets F through the processor 12. Crossover assemblies act at the interfaces between the respective tanks 21, 22, 23 and dryer 24 to transport sheets between the corresponding stations. Rollers 30 may be driven in conventional manner by a common drive shaft 33 (FIG. 3) having alternating right-hand and left-hand axially-spaced worms for driving adjacent columns of rollers 30 at the same speed in counterrotation, so as to move the sheets F in the direction of the arrows along path 16. Drive shaft 33 may be connected by a no slip chain drive and toothed sprockets (not shown) to be driven by an electric motor 34 such as, for example, a variable speed brushless DC motor.

The temperature of developer chemical in tank 21 may be controlled by means of a recirculation plumbing path 35 (FIG. 2) having a pump P for drawing developer out of tank 21, through a thermowell or other suitable heater 36, and then passing it back to the tank 21. A temperature sensor 37 (FIG. 3) is provided in the tank 21 or recirculation path 35 to monitor the temperature of the developer. Developer temperature may be displayed on a meter 41 located on an exterior control panel 42 of the processor 12. Temperature control of fixer chemistry may be conveniently provided by passing an immersed loop 39 through the fixer tank 22.

Figure 3:
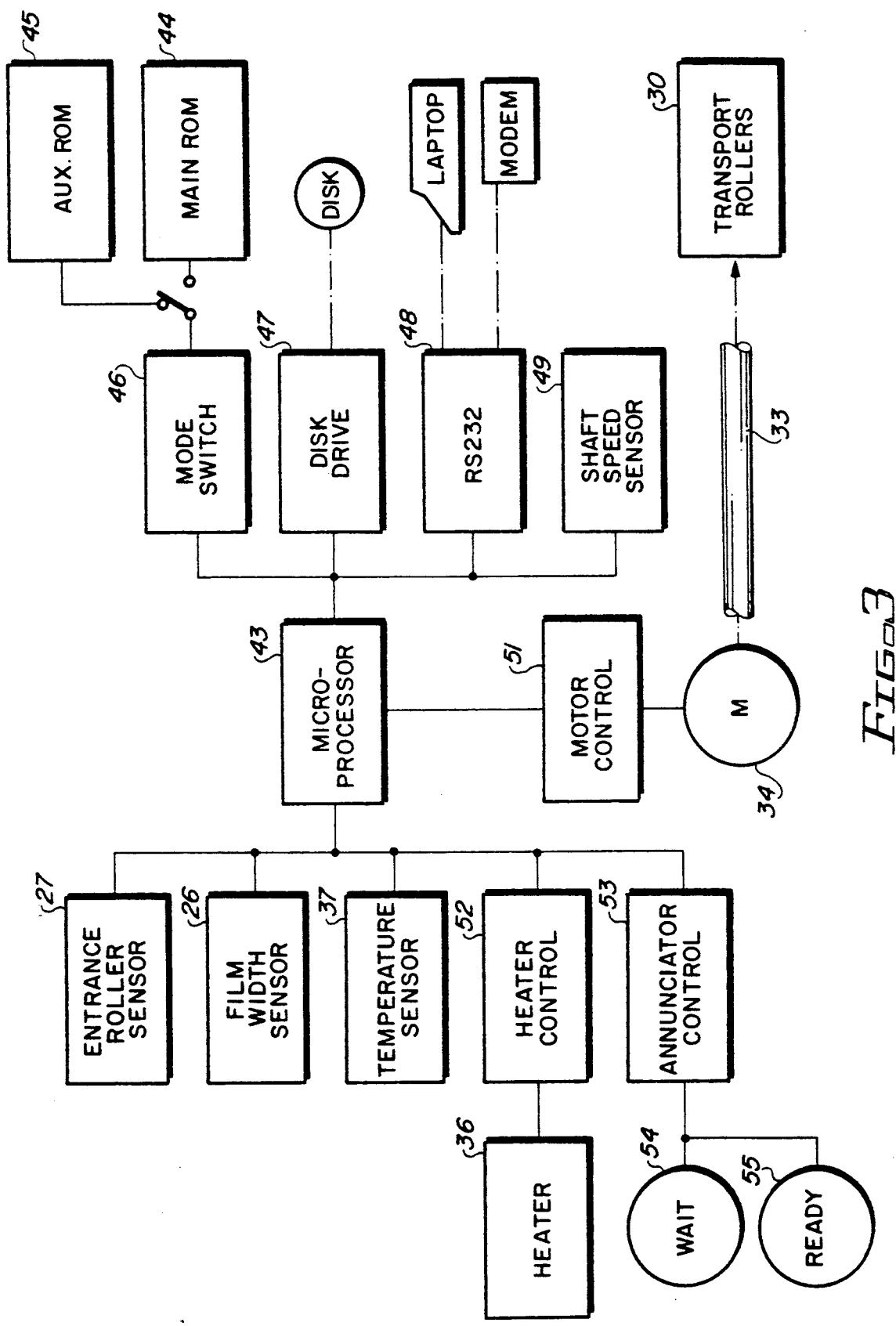
FIG. 3 is a block diagram of a control circuit in accordance with the system of the present invention.

FIG. 3 illustrates processor control circuitry usable in implementing an embodiment of the present invention. As shown in FIG. 3, a microcomputer includes a microprocessor 43 connected as shown to direct the operation of the processor 12. Microprocessor 43 receives software instructions for its operation from a main read-only memory (ROM) processor 44 or an auxiliary read-only memory (ROM) 45 in accordance with the setting of a mode switch 46, as to whether programming or normal mode of operation is desired. In the normal mode of operation, microprocessor 43 will access the main ROM 44 using sequentially generated addresses in accordance with known techniques to retrieve program instructions and data for use in exercising the control function. In the programming mode of operation, microprocessor 43 will direct the reprogramming of the main ROM 44, as described further below, using instructions retrieved from the auxiliary ROM 45.

One way to implement mode switch 46 is by means of a switch 46' provided on the control panel 42 (FIG. 1) for manual user-implemented selection between normal and programming modes. The switch can also be implemented by software means, as described below in connection with FIGS. 5-7C.

Microprocessor 43 is also connected to receive input information from the film width sensor 26, the entrance roller sensor 27, the developer temperature sensor 37 and a shaft speed sensor 49. Microprocessor 43 is also connected to motor control circuitry 51, heater control circuitry 52, and annunciator control circuitry 53. Circuitry 51 controls the motor M; circuitry 52 controls the heater 36; and circuitry 53 controls "WAIT" and "READY" indicator lights 54, 55.

Figure 4:
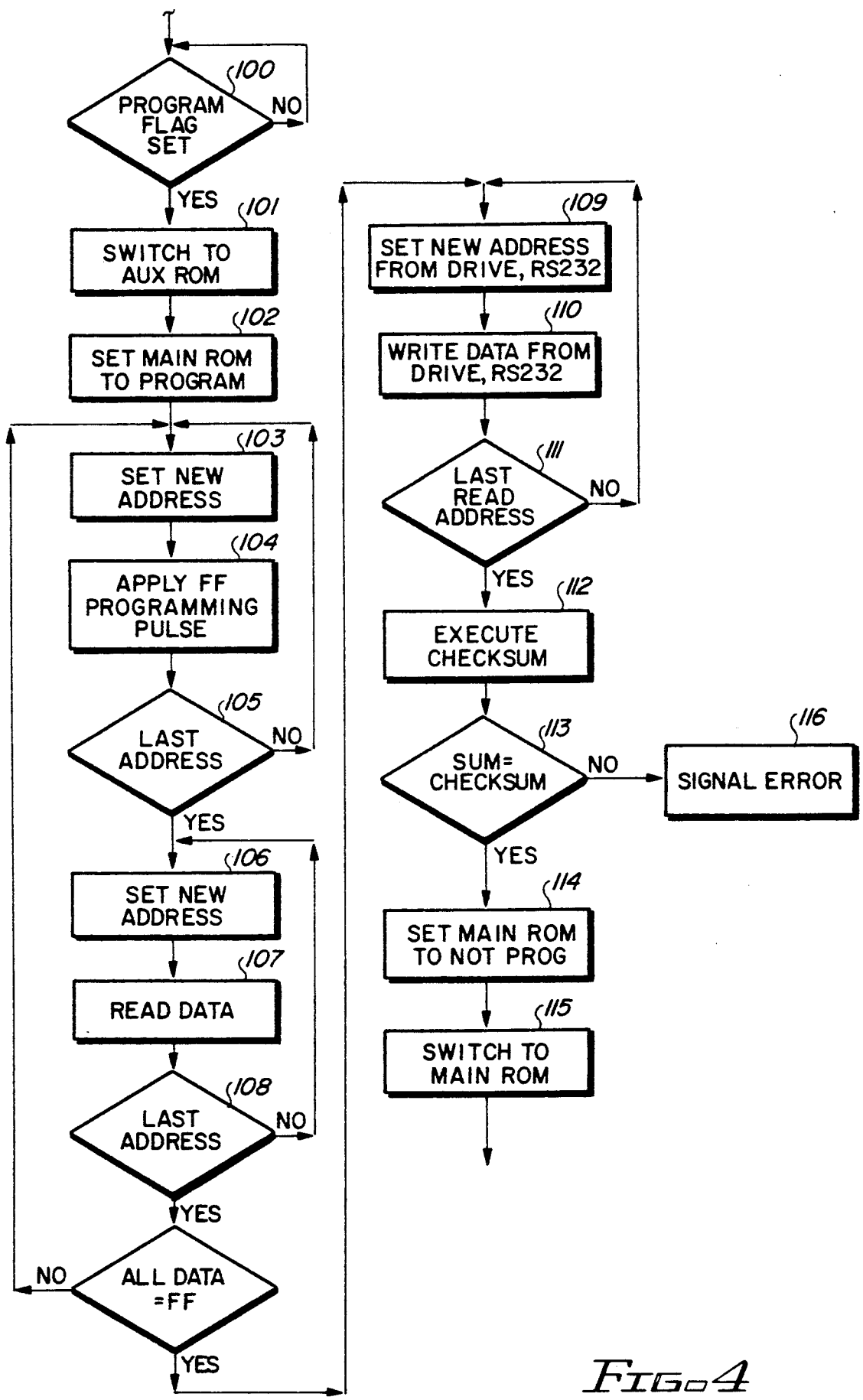
FIG. 4 is a flow diagram of the operation of the system of FIG. 3.

In accordance with the invention, as indicated in the flow diagram of FIG. 4, in response to a change of mode flag, switch 46 changes the control circuit configuration from one of normal operation to one of software reprogramming. Microprocessor 43 is connected to receive a "bootstrap" program set of instructions from auxiliary ROM 45 to cause the erasure (i.e., overwriting with FFs) of the main ROM 44 and subsequent reprogramming of the same in accordance with addresses and data retrieved from an external source.

The programming mode flag is detected at 100 in response to manual setting of the mode switch 46 or a receipt of a software signal. This connects the auxiliary ROM 45 to send instructions to the microprocessor 43 and sets the main ROM 44 into its programming mode (101, 102). For a main ROM 44 in the form of an EEPROM such as commercially available from Intel having a "not chip select/write enable" (CS WE) line, the TTL level is changed (i.e., raised to +12 V), putting the PROM chip in program mode. Erasure (i.e., overwrite to FFs) then occurs by sequentially applying programming pulses to the chip programming input and cycling through all addresses of the chip (103, 104, 105). The erasure (i.e., overwrite) is then verified by reading out all address locations of the main ROM 44 to verify that all locations contain FF (106, 107, 108). If the memory 44 has not been cleared, the erasure process is repeated.

Once erasure is complete, the updated software is written into the main ROM 44 in accordance with addresses and data furnished from a disk in disk drive 47, or a laptop or remote computer or other data source connected to the RS232 port 48. The appropriate address and data are presented at TTL levels and, depending on the nature of the EEPROM, single or multiple pulses are applied to the programming input in accordance with known programming techniques (109, 110, 111). Thereafter, the contents of all the addresses of the main PROM 44 are read out and their accuracy confirmed such as by means of a "checksum" or similar procedure. The "checksum" value may be read from the external source together with the remainder of the updated program, as one of the blocks entered by address in a block-by-block transfer of the updated program (e.g., address lines A0-A9 and data lines D0-D7) from the external source (e.g., a floppy disk memory storage device) to the on-board main PROM 44. If the "checksum" is valid (112, 113), the switch 46 is actuated to return the control circuitry back to its normal operating state (114, 115). If the "checksum" does not confirm, an error signal may be actuated (116) at once, or after several automatic retries of steps 109-113. "Read," "write," and "programming" indicators (not shown) may optionally be provided on the control panel. The programmer structure may take a form similar to that described in the McIntosh et al. article, referenced above, the disclosure of which is incorporated herein by reference; however, tailored to the type of EEPROM used and overlain on the normal control circuitry of the film processor. The steps of flow chart FIG. 4, encoding and data format are modified as necessary for the selected EEPROM characteristics.

A system for updating software in an automatic film processor in accordance with the invention, as thus described, permits installation of an initial ROM operating program or the effective replacement of a superseded ROM operating program with a new version, without the necessity for physically mechanically disturbing the main ROM in any way. The system may be set so that the code in the auxiliary ROM (which may also be a PROM) may include a normal bootstrap program which is executed first before control is turned over to the main ROM for executing the main program. The auxiliary ROM will contain a main ROM routine which is executed in predetermined sequence when the mode switch indicates a main ROM programming mode. The system of the present invention enables the product software to be changed without risk of damage due to mechanical displacement. Should the new program be faulty in some way, the prior program can be reloaded.

Figure 5:
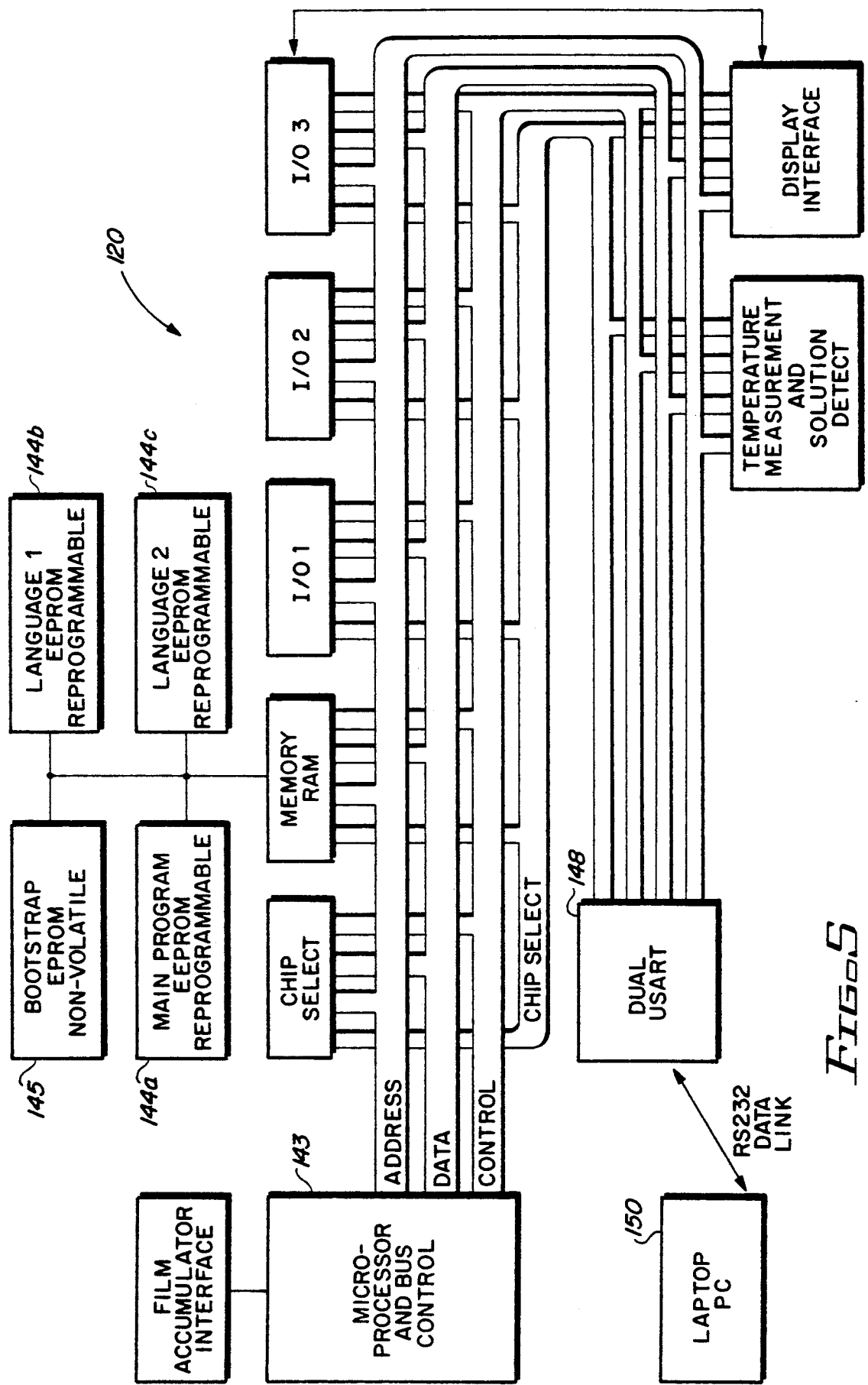
FIG. 5 is a block diagram of an embodiment of a control circuit board in accordance with the invention.

FIG. 5 shows elements of a control circuit that may be included on a board 120 suitable for installation in a processor to implement the principles of the invention. The illustrated embodiment includes an auxiliary ROM in the form of a non-volatile bootstrap EEPROM 145, and main ROMs in the form of a reprogrammable main operating program ROM 144a and a plurality of reprogrammable different language ROMS 144b, 144c. A dual universal asynchronous receiver-transmitter circuit 148 provides an RS232 data link to act as a software download interface between the board 120 and, e.g., an MS-DOS laptop personal computer 150. The software download interface allows a new version of operating program software or language text software to be downloaded to the processor. It also allows the downloading of operating program software and language text software to the processor the first time the processor is actuated at the time of assembly installation.

The software download interface is controlled by interface control software that has two parts: one part is resident and runs on the processor board 120 itself; the other part is resident and runs on the laptop computer 150. The portion of the software download interface package that runs on the processor board 120 is located in the non-volatile bootstrap EPROM 145. It is responsible for determining if valid software exists in the processor memory. This can be accomplished by having the bootstrap code read a checksum which is located at a predetermined location in the operating program memory ROM 144a. If the checksum indicates that valid software is present, control is passed to the operating program software. If the checksum is not valid, the software download package will look for a laptop hookup to request downloading of an initial version of the operating software.

The software to be downloaded may be conveniently configured on a disk in the laptop 150 in a known standard format, data to be transferred in a visually monitorable way. A suitable format for this purpose is a conventional S-record format, wherein each record is a hex character string having five fields containing record type and length identifications; address at which the code or data is to be loaded into memory; 0 to n bytes of executable code, memory-loadable data or descriptive information; and a checksum for determining error-free receipt of the record. Each byte of binary data is encoded in the S-record as a two-character hex number. Software downloading, therefore, includes the steps of converting the disk S-record hex files to binary data, transmitting the converted strings as appropriately communication protocol formatted messages from the laptop 150 to the interface 148, verifying the accuracy of receipt of the transmission, and then stripping the received information to program the designated programmable ROM.

The portion of the software download interface package that runs on the laptop 150 is responsible for reading the file containing the new operating program or language software, translating that file from S-record format to binary format, and transmitting the binary data as an RS232 formatted message to the processor board 120. The hex file is downloaded the equivalent of one S-record at a time. The laptop resident interface software is also responsible for updating the processor parameters and configuration structure sizes, if required, and for updating the software version number in the configuration structure.

As part of initialization, before commands are entered, the laptop resident download interface software first identifies itself to the processor by way of a description command. Upon receiving the description command, the processor located software will respond with a return description command. The laptop resident download software can then determine what type of processor the laptop is connected to. This enables the laptop to select the correct software version to be downloaded, depending on the type of processor involved.

The hardware interface suitably comprises a D-type 15-pin connector with the following pin configuration: Pin 1-Shield; Pin 2-Transmit Data (TXD); Pin 3-Receive Data (RD); Pin 4-Clear to Send (CTS); Pin 5-Request to Send (RTS); and Pin 6-Signal Common. Pins 7-15 are unused. The electrical characteristics of the serial interface (Pins 1-6) can be set to conform to Section Two of the EIA-232-D standard.

All commands and data are sent using standard protocol techniques. The processor resident software is contained in the non-volatile memory chip 145 and operates in such a way as to allow for downloading of the code and data for initializing or updating the program and language EEPROMs, without needing to be downloaded itself. This bootstrap software should be generic enough so that it will not need to be changed with each change of the operating software. It can communicate with the laptop through the serial channel and is able to erase and reprogram the program EEPROM 145a or any one of the language EEPROMs 145b, 145c, independently, as well as write to the board RAM memory 149. The bootstrap program is configured to have its own timers, communications and interrupt structure, so that it is able to run on its own, without depending on anything from the main program operating software. In order to allow for different interrupt structures, both the boot code and the regular operating software have different versions of the jump table. An area of memory in zero-page RAM is reserved for holding the appropriate jump table. As each package starts running, and before any interrupts are enabled, it copies its own version of the jump table into the reserved RAM area.

Figure 6:
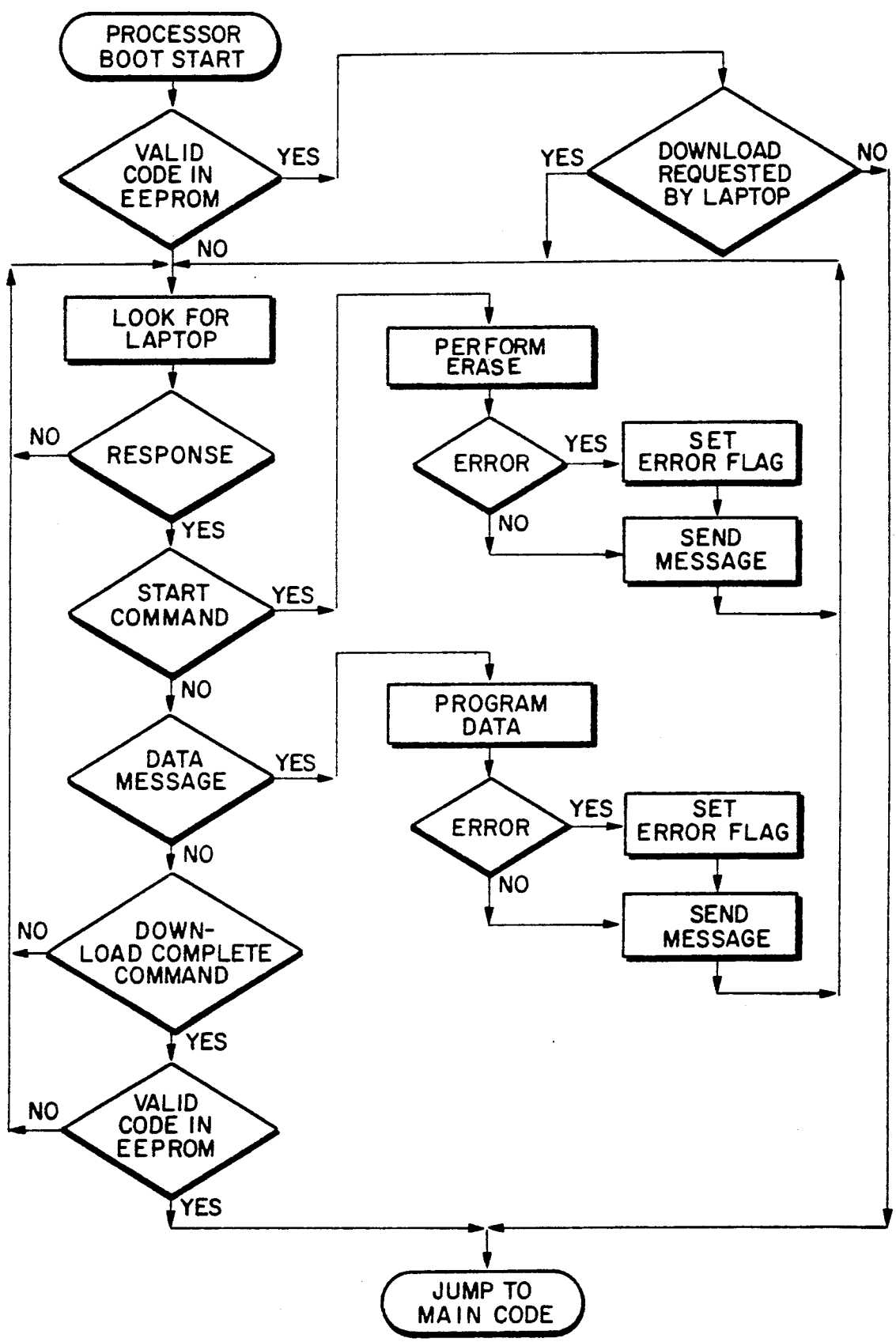
FIG. 6 is a flow diagram of processor resident software suitable for establishing the download interface for the board of FIG. 5.

The bootstrap code resident in the non-volatile ROM 145 is structured to be able to determine whether new code is to be downloaded to the processor from an external device; thus, providing a software version of the mode switch 46 of FIG. 3. This may be accomplished, for instance, by configuring the operating software program of EEPROM 144a to provide a checksum built into the first or last two bytes. If when the bootstrap code checks this location the value is 0xFFFF, for example, this indicates that no operating program software yet exists on board 120, so the bootstrap code looks for the laptop 150 in order to perform a download. As the download is completed, the valid checksum for the downloaded code is burned into the designated two bytes of the ROM 144a. If the bootstrap code detects a valid checksum at the designated bytes, the bootstrap then checks a software flag location, e.g. 0x40, in RAM 149 to determine if a download has been requested by the laptop via the operating software. If the value of the flag indicates that a download has been requested, the bootstrap code will look for the laptop 150. However, if the value of the flag indicates that a download is not requested, the bootstrap code will pass control to the operating software. The flow diagram for such bootstrap program is shown in FIG. 6.

The portion of the software download code that resides in the laptop 150 communicates with the processor board 120 and can be formulated to interface with an operator, if desired. The laptop resident code can also, or alternatively, be configured to download to the main program ROM 145a and the language PROMs 145b, 145c without operator intervention. The laptop resident code will read the files containing the operating code and language data to be downloaded from a disk (either hard or floppy) inserted in the laptop 150, convert those files from hex files (S-record format) to binary data, and then format and send them via the RS232 serial communications interface to the processor board 120.

The system may be configured, for example, so that when an operator invokes the software download function on the laptop 150, the operator is asked which type of interface is desired. The software download package then checks for the files containing the information to be downloaded. If the files do not exist, an error will be displayed and the software download package will terminate. If the files do exist, the software download package attempts to communicate with the processor board 120.

Once communication is established, the laptop resident code determines what version of software is running on the processor. If the software version identification step indicates that no operating software is present on the processor and that the laptop resident software download package is communicating with the processor bootstrap software, the downloading process can be started automatically. If the operating software version is determined to be something other than zero, the software download package can be set to tell the operator what software version exists on the processor and what version is available for downloading. The operator can then be asked to confirm whether downloading of a particular version is desired. Once the software download package sees confirmation, it will start the downloading process. A similar identification and confirmation procedure is followed for downloading languages to the ROMs 144b, 144c.

Figure 7A:
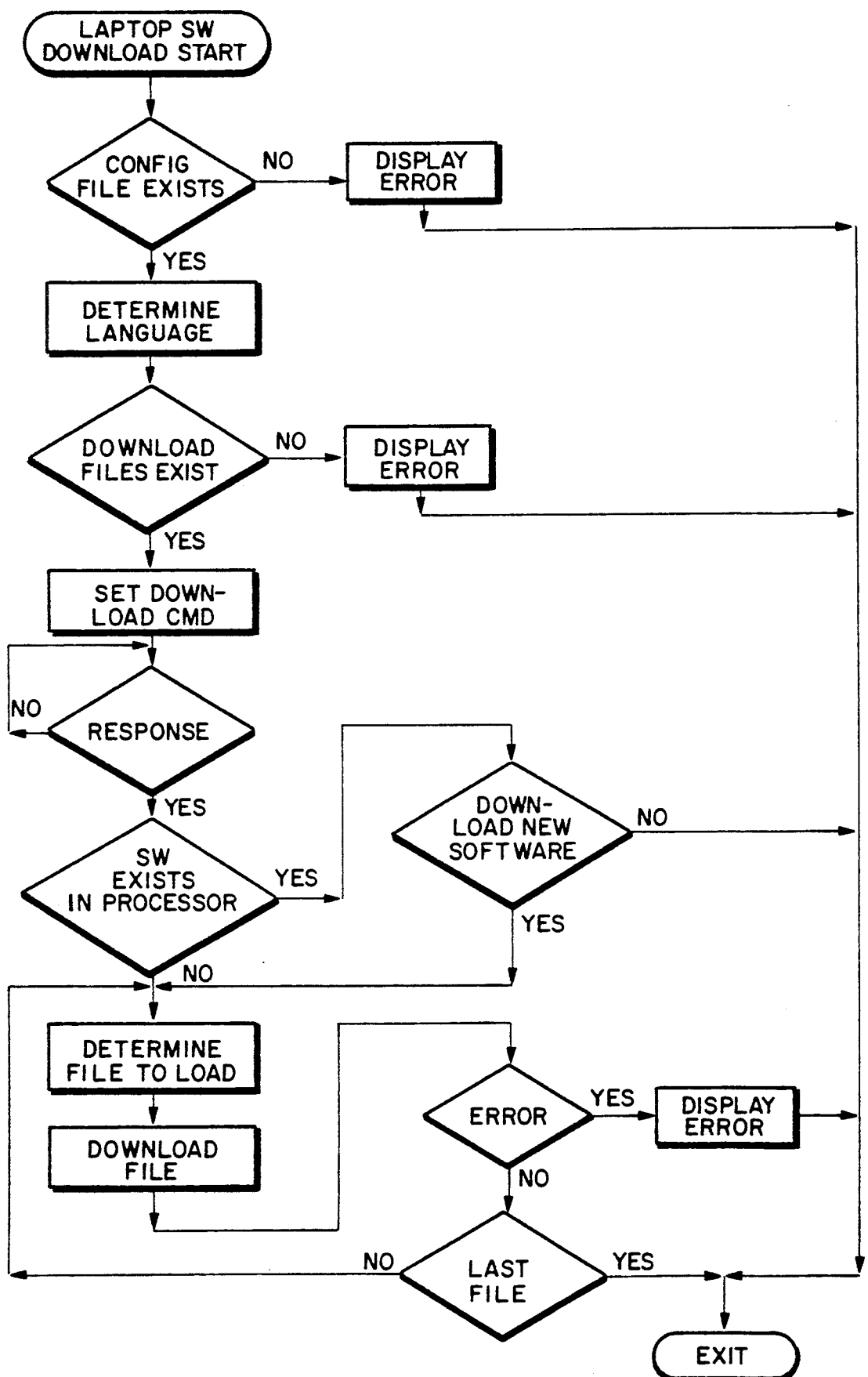
FIG. 7A-C are flow diagrams of the external device resident software suitable for establishing the download interface for the board embodiment of FIG. 5.
Figure 7B:
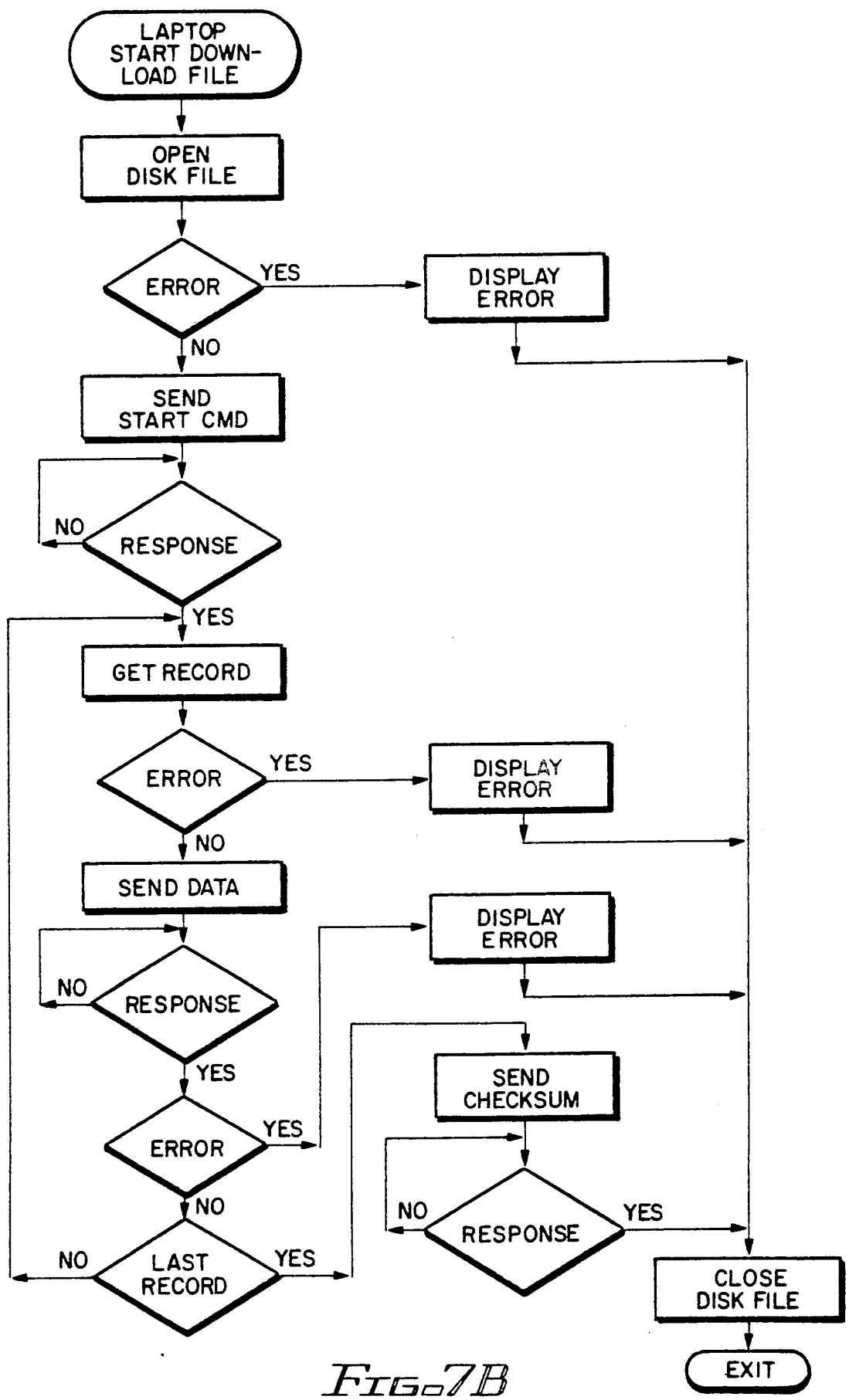
Figure 7C:
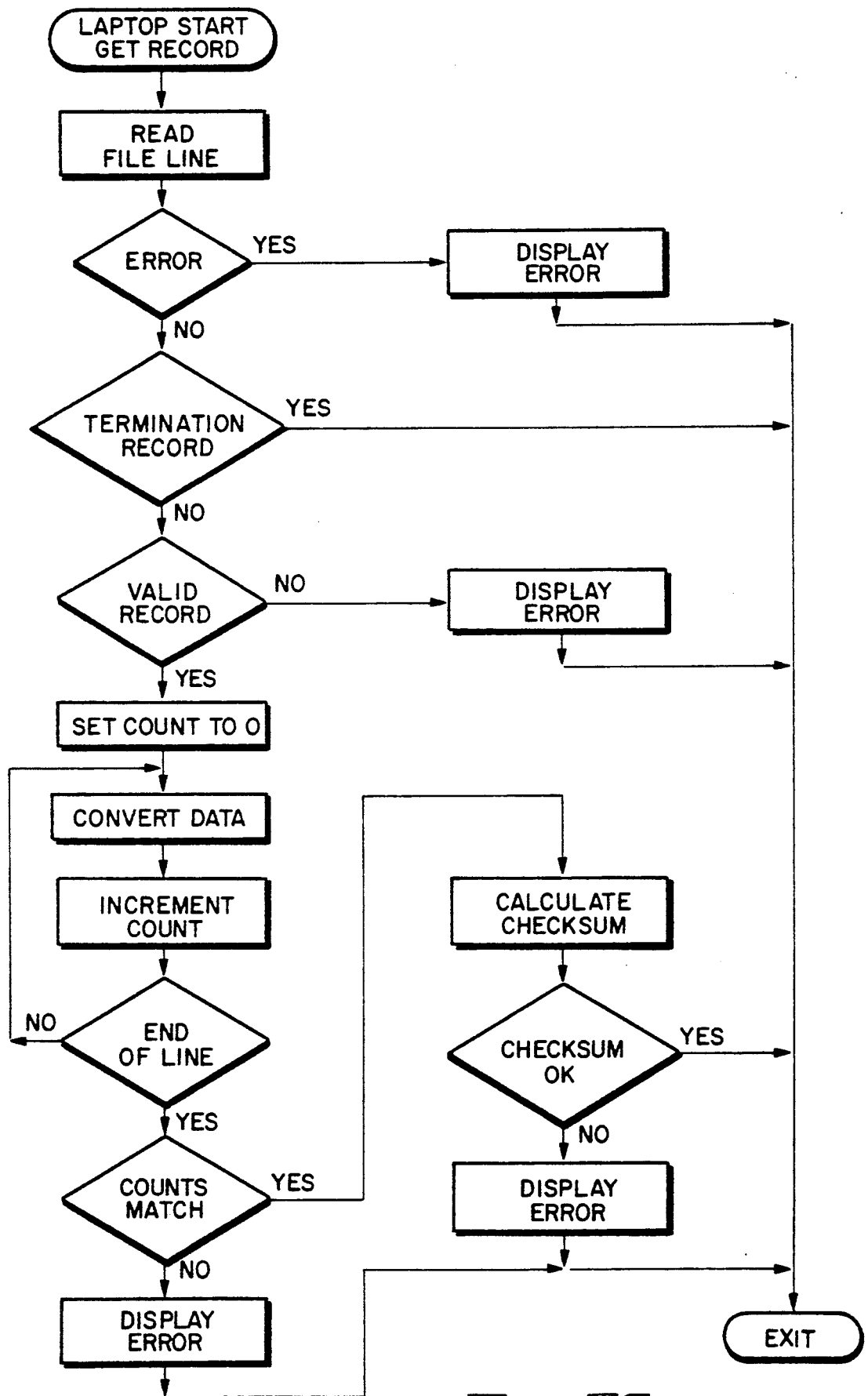

The communications interface between the laptop 150 and processor board 120 is preferably configured to support a plurality of serial communications channels, for transmission and receipt of data asynchronously according to standard protocol, at a suitable baud rate of, e.g., 9600 bits per second. A Start Download command from the laptop to the processor boot includes data indicating to which EEPROM (program, language 1, or language 2) the next data blocks are to be directed. Upon receipt of the Start Download command, the boot erases the EEPROM that is to be reprogrammed. When the erasure is complete, it sends a Download Status message to the laptop 150. The laptop 150 then starts sending messages to the processor board 120 that include the data that is to be programmed into the selected EEPROM. After processing each data message, the processor boot sends a status message back to the laptop 150. Once all of the data has been downloaded, the laptop 150 sends a message to the processor board 120 indicating that the software download process has been completed. If the processor boot determines that there were no errors during the download process, it will pass control to the newly downloaded operating software. Flow diagrams for the laptop resident software are shown in FIGS. 7A-C.

Those skilled in the art to which the invention relates will appreciate that other substitutions and modifications can be made to the described embodiments without departing from the spirit and scope of the invention as described by the claims below.

What is claimed is:

1. A method of updating stored program information in a read-only memory connected for controlling operations of a microprocessor in control circuitry of an apparatus for the automatic processing of exposed photosensitive media having means for automatically transporting said media from a feed point along a path through developer, fixer, wash and dryer stations; characterized in that:

said method includes the steps of providing said read-only memory in the form of a programmable read-only memory; providing an auxiliary read-only memory in said apparatus; switching said control circuitry from a normal mode in which said microprocessor is connected to receive program information from said programmable read-only memory, to a programming mode in which said microprocessor is connected to receive bootstrap program information from said auxiliary read-only memory; and reprogramming said programmable read-only memory by said microprocessor acting in response to said bootstrap program information from said auxiliary read-only memory, using address and data information obtained from an external source; said microprocessor acting in response to receipt of a bootstrap set of instructions from said auxiliary read-only memory to first cause the erasure of said programmable read-only memory by cycling through and writing over all address locations of said programmable read-only memory, to then verify said erasure by cycling through and reading out all said address locations, and to subsequently reprogram said programmable read-only memory in accordance with said address and data information obtained from said external source; whereby said updating can be accomplished without removal of said programmable read-only memory from said apparatus.

2. A method as in claim 1, further characterized in that said microprocessor further acts in response to receipt of said set of instructions, following said reprogramming of said programmable read-only memory, to read out the contents of said programmable read-only memory and confirm the accuracy of said reprogramming; and said method further comprises, if said reprogramming is determined to be accurate, switching said control circuitry back to said normal mode.

3. A method of updating stored program information in a read-only memory connected for controlling operations of a microprocessor in control circuitry of an apparatus for the automatic processing of exposed photosensitive media having means for automatically transporting said media from a feed point along a path through developer, fixer, wash and dryer stations; characterized in that:

said method includes the steps of providing said read-only memory in the form of a programmable read-only memory; providing an auxiliary read-only memory in said apparatus; switching said control circuitry from a normal mode in which said microprocessor is connected to receive program information from said programmable read-only memory, to a programming mode in which said microprocessor is connected to receive bootstrap program information from said auxiliary read-only memory; and reprogramming said programmable read-only memory by said microprocessor acting in response to said bootstrap program information from said auxiliary read-only memory, using address and data information obtained from an external source; said switching from normal to programming mode being implemented by manually setting a switch; whereby said updating can be accomplished without removal of said programmable read-only memory from said apparatus.

4. A method of updating stored program information in a read-only memory connected for controlling operations of a microprocessor in control circuitry of an apparatus for the automatic processing of exposed photosensitive media having means for automatically transporting said media from a feed point along a path through developer, fixer, wash and dryer stations; characterized in that:

said method includes the steps of providing said read-only memory in the form of a programmable read-only memory; providing an auxiliary read-only memory in said apparatus; switching said control circuitry from a normal mode in which said microprocessor is connected to receive program information from said programmable read-only memory, to a programming mode in which said microprocessor is connected to receive bootstrap program information said auxiliary read-only memory; and reprogramming said programmable read-only memory by said microprocessor acting in response to said bootstrap program information from said auxiliary read-only memory, using address and data information obtained from an external source; said switching from normal to programming mode being implemented by a software-settable switch; whereby said updating can be accomplished without removal of said programmable read-only memory from said apparatus.

5. A method as in claim 4, wherein said switching from normal to programming mode occurs in response to the contents of a checksum address location in said programmable read-only memory.

6. A method as in claim 4 wherein said control circuitry includes a random access memory, and said switching from normal to programming mode occurs in response to the contents of a software flag address location in said random access memory.

7. A method of updating stored program information in a read-only memory connected for controlling operations of a microprocessor in control circuitry of an apparatus for the automatic processing of exposed photosensitive media having means for automatically transporting said media from a feed point along a path through developer, fixer, wash and dryer stations; characterized in that:

said method includes the steps of providing said read-only memory in the form of a programmable read-only memory; providing an auxiliary read-only memory in said apparatus; switching said control circuitry from a normal mode in which said microprocessor is connected to receive program information from said programmable read-only memory, to a programming mode in which said microprocessor is connected to receive bootstrap program information from said auxiliary read-only memory; and reprogramming said programmable read-only memory by said microprocessor acting in response to said bootstrap program information from said auxiliary read-only memory, using address and data information obtained from an external source; said external source being in the form of a memory storage disk, whereby said updating can be accomplished without removal of said programmable read-only memory from said apparatus.

8. A method of updating stored program information in a read-only memory connected for controlling operations of a microprocessor in control circuitry of an apparatus for the automatic processing of exposed photosensitive media having means for automatically transporting said media from a feed point along a path through developer, fixer, wash and dryer stations; characterized in that:

said method includes the steps of providing said read-only memory in the form of a programmable read-only memory; providing an auxiliary read-only memory in said apparatus; switching said control circuitry from a normal mode in which said microprocessor is connected to receive program information from said programmable read-only memory, to a programming mode in which said microprocessor is connected to receive bootstrap program information from said auxiliary read-only memory; and reprogramming said programmable read-only memory by said microprocessor acting in response to said bootstrap program information from said auxiliary read-only memory, using address and data information obtained from an external source; said external source being in the form of an external computer connected to said control circuitry by means of a binary data transfer communications link; whereby said updating can be accomplished without removal of said programmable read-only memory from said apparatus.

9. A method as in claim 8, wherein an asynchronous receiver-transmitter circuit provides an RS-232 data link to act as a software download interface between said control circuitry and said external computer.

10. A method as in claim 9, wherein interface software for controlling transfer of said address and data information from said external computer by means of said RS-232 data link is resident in said auxiliary read-only memory.

11. A method as in claim 10, wherein said address and data information is obtained by converting and downloading address and data information configured in S-record format at said external source.

12. In apparatus for the automatic processing of exposed photosensitive media, said apparatus having means for automatically transporting said media from a feed point along a path through developer, fixer, wash and dryer stations and control circuitry including a microprocessor and a programmable read-only memory associated with said microprocessor to provide operating program information thereto for controlling said processor operations, a method of programming said operating program information without removal of said programmable read-only memory, characterized in that it comprises the steps of:

providing, in said control circuitry, an auxiliary read-only memory containing bootstrap program information for programming said programmable read-only memory using address and data information obtained from an external source;

placing said control circuitry in a first mode in which said microprocessor is connected to receive said bootstrap program information from said auxiliary read-only memory;

checking said programmable read-only memory by said microprocessor acting in response to said bootstrap program information from said auxiliary read-only memory, to determine the presence of valid operating program information in said programmable read-only memory;

in response to determining an absence of said valid operating program information, programming said programmable read-only memory by said microprocessor acting in response to said bootstrap program information, using address and data information obtained from an external source; and in response to determining said presence of said valid operating program information, switching said control circuitry from said first mode to a second mode in which said microprocessor is connected to receive said program information from said programmable read-only memory.

13. A method as in claim 12, wherein said checking step is repeated after said programming step is performed.

14. A method as in claim 12, wherein said checking step is accomplished by checking the contents of a checksum address location in said programmable read-only memory.

15. A method as in claim 12, wherein said control circuitry includes a random access memory; said method further comprises the step of checking said random access memory by said microprocessor in response to said bootstrap program information when said control circuitry is placed in said first mode, to determine the presence of a program request at a software flag address location in said random access memory; and said programming step is also performed in response to determining said presence of said program request, before said switching to said second mode.

16. A method as in claim 15, wherein said programmable read-only memory comprises a plurality of programmable read-only memory elements, and said programming step comprises the step of programming said plurality of programmable read-only memory elements, using element selection information obtained from said external source.

17. A method as in claim 15, wherein said external source is an external computer connected to said control circuitry by means of an RS-232 binary data transfer communications link.

18. A method as in claim 17, wherein interface software for controlling transfer of said address and data information from said external computer by means of said RS-232 data link is resident in said auxiliary read-only memory.

19. A method as in claim 18, wherein said address and data information is obtained by converting and downloading address and data information configured in S-record format at said external source.

* * * * *